US012776024B2

(12) United States Patent
Ishikawa et al.

(10) Patent No.: US 12,776,024 B2
(45) Date of Patent: Oct. 27, 2026

(54) IMAGE INSPECTION SYSTEM THAT IDENTIFIES DEFECTIVE REGIONS

(71) Applicant: FUJIFILM Business Innovation Corp., Tokyo (JP)

(72) Inventors: Shogo Ishikawa, Kanagawa (JP); Takashi Kikumoto, Kanagawa (JP); Yoshie Ohira, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 18/183,454

(22) Filed: Mar. 14, 2023

(65) Prior Publication Data

US 2024/0095904 A1 Mar. 21, 2024

(30) Foreign Application Priority Data

Sep. 16, 2022 (JP) ................................ 2022-147583

(51) Int. Cl.
*G06T 7/00* (2017.01)
*G06T 5/50* (2006.01)
(Continued)

(52) U.S. Cl.
CPC ................ *G06T 7/001* (2013.01); *G06T 5/50* (2013.01); *G06T 9/00* (2013.01); *G06V 10/25* (2022.01);
(Continued)

(58) Field of Classification Search
CPC . G06T 7/001; G06T 2207/30148; G06T 5/50; G06T 2207/10061;
(Continued)

(56) References Cited

U.S. PATENT DOCUMENTS

2005/0284324 A1* 12/2005 Fukui .................. B41F 33/0045 101/484
2013/0294677 A1* 11/2013 Urano .................. G01N 21/956 382/141
2023/0238290 A1* 7/2023 Kondo ............... G01N 21/9501 438/14

FOREIGN PATENT DOCUMENTS

JP 2007-147354 A 6/2007
JP 2018151494 A 9/2018
WO 2009028173 A1 3/2009

OTHER PUBLICATIONS

Kumar, Sidharth, et al. "Efficient I/O and storage of adaptive-resolution data." SC'14: Proceedings of the International Conference for High Performance Computing, Networking, Storage and Analysis. IEEE, 2014.*

(Continued)

*Primary Examiner* — Li Liu
(74) *Attorney, Agent, or Firm* — Oliff PLC

(57) ABSTRACT

An image processing apparatus includes a processor configured to: compare reference image data serving as a reference for inspection with inspection-target image data expressing an inspection target and identify a coordinate region including a difference between the reference image data and the inspection-target image data as a defective region; and store a satisfactory region in the reference image data and the satisfactory region in the inspection-target image data in a low volume format with a low data volume into a memory; and store the defective region in the reference image data and the defective region in the inspection-target image data in a high image quality format with a large data volume and high image quality, as compared with the low volume format, into the memory, the satisfactory region being a region other than the defective region.

12 Claims, 8 Drawing Sheets

(51) Int. Cl.
*G06T 9/00* (2006.01)
*G06V 10/25* (2022.01)
*G06V 10/74* (2022.01)

(52) U.S. Cl.
CPC .. *G06V 10/761* (2022.01); *G06T 2207/20221* (2013.01)

(58) Field of Classification Search
CPC . G06T 2207/20092; G06T 2207/30144; G06T 2207/30168; G06T 7/0002; G06T 7/0008; G06V 10/761; G06V 10/25; G06V 10/993
See application file for complete search history.

(56) References Cited

OTHER PUBLICATIONS

Aug. 4, 2026 Office Action issued in Japanese Patent Application No. 2022-147583.

* cited by examiner

IMAGE INSPECTION SYSTEM THAT IDENTIFIES DEFECTIVE REGIONS

CROSS-REFERENCE TO RELATED APPLICATIONS

This application is based on and claims priority under 35 USC 119 from Japanese Patent Application No. 2022-147583 filed Sep. 16, 2022.

BACKGROUND

(i) Technical Field

The present disclosure relates to image processing apparatuses, image processing methods, and non-transitory computer readable media.

(ii) Related Art

In the related art, image data expressing an inspection target determined as being defective in an inspection is stored.

For example, Japanese Unexamined Patent Application Publication No. 2007-147345 discloses an inspection device that inspects a substrate equipped with an electronic component and that stores image data of a defective substrate. The inspection device stores high-compressed image data of the entire substrate and low-compressed image data of a defective region.

SUMMARY

An inspection target is sometimes inspected by comparing reference image data serving as a reference for inspection with inspection-target image data expressing the inspection target. In this case, the reference image data may be stored in addition to the inspection-target image data for allowing a user to check the inspection result after the inspection or for evidence of the inspection result.

In a case where the reference image data varies depending on the inspection target, if the number of inspection targets increases, the number of pieces of reference image data increases in addition to the number of pieces of inspection-target image data. This may lead to a lack of storage capacity in a memory that stores the reference image data and the inspection-target image data.

In order to suppress a lack of storage capacity in the memory, it is conceivable to entirely compress the reference image data and the inspection-target image data and store them in a low volume format into the memory. However, this may deteriorate the overall image quality of the reference image data and the inspection-target image data, thus making it difficult for the user to check the inspection result or possibly making it difficult for the reference image data and the inspection-target image data to serve as evidence, which is not appropriate.

Aspects of non-limiting embodiments of the present disclosure relate to reducing the data volumes of the reference image data and the inspection-target image data while suppressing deterioration in the image quality of a defective region including a difference between the reference image data and the inspection-target image data.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to: compare reference image data serving as a reference for inspection with inspection-target image data expressing an inspection target and identify a coordinate region including a difference between the reference image data and the inspection-target image data as a defective region; and store a satisfactory region in the reference image data and the satisfactory region in the inspection-target image data in a low volume format with a low data volume into a memory; and store the defective region in the reference image data and the defective region in the inspection-target image data in a high image quality format with a large data volume and high image quality, as compared with the low volume format, into the memory, the satisfactory region being a region other than the defective region.

BRIEF DESCRIPTION OF THE DRAWINGS

An exemplary embodiment of the present disclosure will be described in detail based on the following figures, wherein.

DETAILED DESCRIPTION

Figure 1:
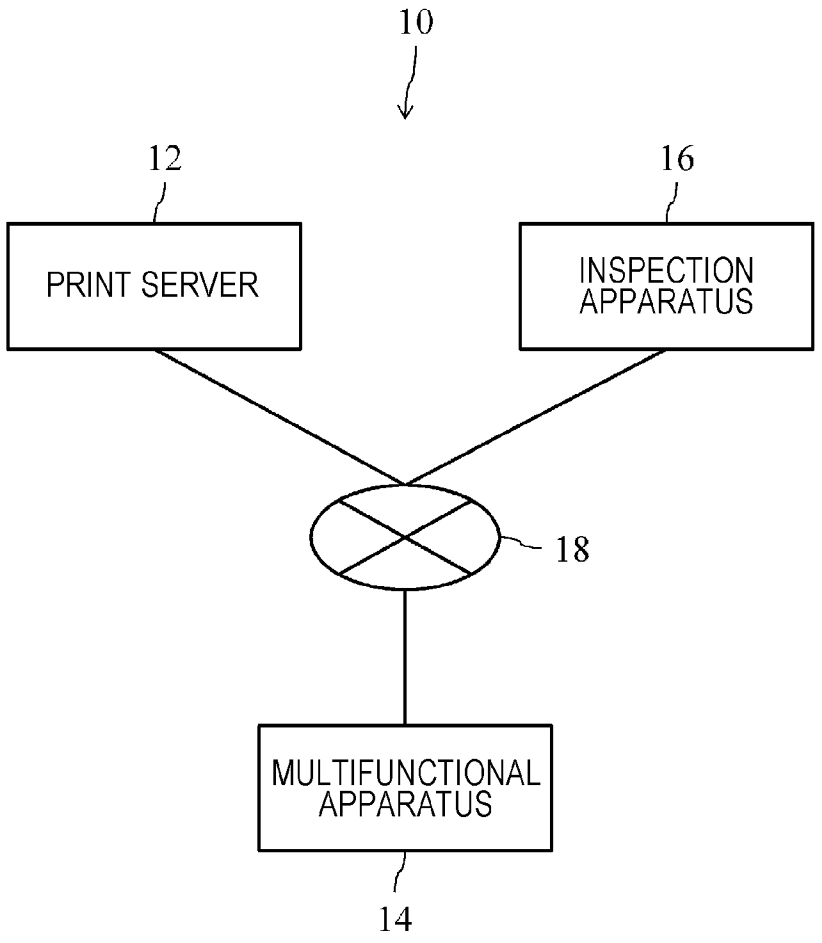
FIG. 1 schematically illustrates the configuration of an inspection system according to an exemplary embodiment.

FIG. 1 schematically illustrates the configuration of an inspection system 10 according to an exemplary embodiment. The inspection system 10 compares reference image data serving as a reference for inspection with inspection-target image data expressing an inspection target so as to detect a difference between the reference image data and the inspection-target image data. Accordingly, for example, a defect in the inspection target is detected. In this exemplary embodiment, the inspection target is a print medium having undergone printing in a multifunctional apparatus 14. In other words, the inspection system 10 detects whether there is a defect (such as a print failure or contamination) in the print medium having undergone printing in the multifunctional apparatus 14.

If a difference is detected between the reference image data and the inspection-target image data, the inspection system 10 stores the reference image data and the inspection-target image data for allowing a user to check the inspection result later or for evidence of the inspection result.

As shown in FIG. 1, the inspection system 10 includes a print server 12, the multifunctional apparatus 14, and an inspection apparatus 16 serving as an image processing apparatus. The print server 12, the multifunctional apparatus 14, and the inspection apparatus 16 are connected to one another in a communicable manner via a communication line 18, such as a local area network (LAN) or a wide area network (WAN).

The print server 12 is constituted of, for example, a computer. The print server 12 includes a communication interface used for communicating with the multifunctional apparatus 14 and the inspection apparatus 16 via the communication line 18, a display, an input interface used by the user for inputting a command, a memory for storing data, and a processor that executes various processes.

The print server 12 receives, from a user terminal (not shown) used by the user, a print job as a print request for causing the multifunctional apparatus 14 to execute a printing process. The print server 12 executes a rasterizing process based on the print job so as to convert print image data corresponding to a print command in the print job into raster image data (e.g., bit-map image data) recognizable by the multifunctional apparatus 14. In this exemplary embodiment, the raster image data is used as the reference image data serving as a reference for inspection. The print server 12 transmits the raster image data to the multifunctional apparatus 14 and the inspection apparatus 16.

The print server 12 is also capable of analyzing the print job to identify the content of the print image data (i.e., the raster image data). Specifically, the print server 12 is capable of identifying a text region where text is printed, an image region where, for example, a picture or a photograph is printed, and so on in the raster image data. The print server 12 is also capable of identifying a color region printed in color and a monochrome region printed in monochrome or gray scale in the raster image data. Analysis information obtained as a result of analyzing the print job in this manner is transmitted to the inspection apparatus 16.

The multifunctional apparatus 14 includes a communication interface used for communicating with the print server 12 and the inspection apparatus 16 via the communication line 18, and also includes a printer and a scanner. The printer includes, for example, a charging roller, a photoconductor drum, a transfer roller, a fixing roller, a pressing roller, toner, and a medium transport mechanism for transporting the print medium. The scanner includes, for example, a light source and an image sensor.

The multifunctional apparatus 14 executes, for example, a printing process involving printing the print image data related to the print job onto the print medium, such as paper, and a scanning process involving optically reading a read target, such as the print medium, and generating image data expressing the read target.

The multifunctional apparatus 14 prints the raster image data received from the print server 12 onto the print medium and uses the scanner to optically read the print medium having the raster image data printed thereon, thereby acquiring read image data expressing the print medium. In this exemplary embodiment, the print medium having the raster image data printed thereon is the inspection target, and the read image data is used as the inspection-target image data. The multifunctional apparatus 14 transmits the read image data to the inspection apparatus 16.

Figure 2:
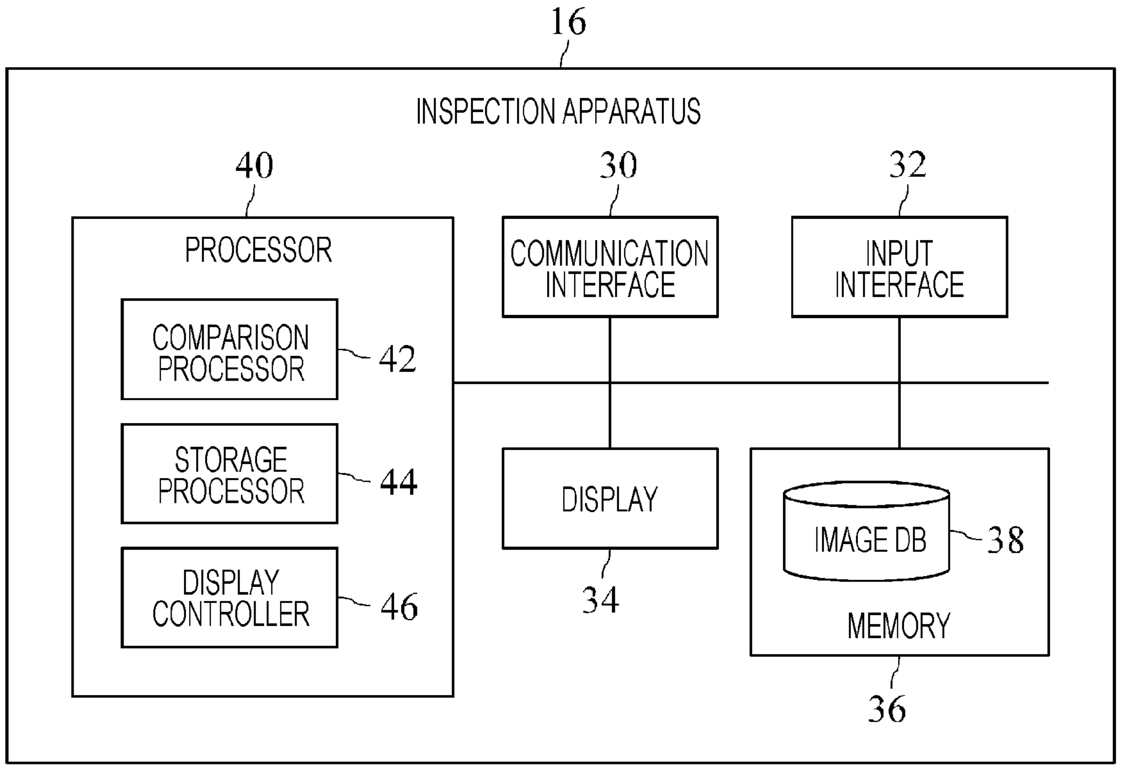
FIG. 2 schematically illustrates the configuration of an inspection apparatus.

FIG. 2 schematically illustrates the configuration of the inspection apparatus 16. The inspection apparatus 16 is constituted of, for example, a server computer, but may alternatively be any apparatus so long as it is capable of exhibiting functions to be described below.

A communication interface 30 includes, for example, a network adapter. The communication interface 30 exhibits a function for communicating with the print server 12 and the multifunctional apparatus 14 via the communication line 18. The communication interface 30 receives the reference image data (i.e., the raster image data in this exemplary embodiment) from the print server 12 and receives the inspection-target image data (i.e., the read image data in this exemplary embodiment) from the multifunctional apparatus 14.

An input interface 32 is constituted of, for example, a mouse, a keyboard, or a touchscreen. The input interface 32 is used by the user for inputting various commands to the inspection apparatus 16.

A display 34 serving as a display is constituted of, for example, a liquid crystal panel or an organic electro-luminescence (EL) display. A processor 40 (i.e., a display controller 46) to be described later causes the display 34 to display various screens.

A memory 36 includes, for example, a hard disk drive (HDD), a solid state drive (SSD), a read-only memory (ROM), or a random access memory (RAM). The memory 36 may be provided separately from the processor 40 to be described below, or may at least partially be provided inside the processor 40. The memory 36 has an image processing program stored therein for causing the components of the inspection apparatus 16 to operate. The image processing program may be stored in a non-transitory computer readable storage medium, such as a universal serial bus (USB) memory or a compact-disc read-only memory (CD-ROM). The inspection apparatus 16 is also capable of executing the image processing program by reading the image processing program from such a storage medium. Furthermore, as shown in FIG. 2, the memory 36 has an image database (DB) 38 stored therein.

In the image DB 38, the reference image data received from the print server 12 and the inspection-target image data received from the multifunctional apparatus 14 and corresponding to the reference image data are stored in association with each other. In this exemplary embodiment, when the processor 40 (i.e., a comparison processor 42 to be described later) determines that there is a difference between the reference image data and the inspection-target image data, the reference image data and the inspection-target image data are stored in the image DB 38 for allowing the user to check the inspection result later or for evidence of the inspection result. A method of how the reference image data and the inspection-target image data are stored in the image DB 38 will be described later.

The processor 40 refers to hardware in a broad sense and includes at least one of a general processor (e.g., CPU: Central Processing Unit) and a dedicated processor (e.g., GPU: Graphics Processing Unit, ASIC: Application Specific Integrated Circuit, FPGA: Field Programmable Gate Array, and programmable logic device). The processor 40 is broad enough to encompass one processor or plural processors in collaboration which are located physically apart from each other but may work cooperatively. As shown in FIG. 1, the processor 40 functions as the comparison processor 42, a storage processor 44, and the display controller 46 in accordance with the image processing program stored in the memory 36.

Figure 3:
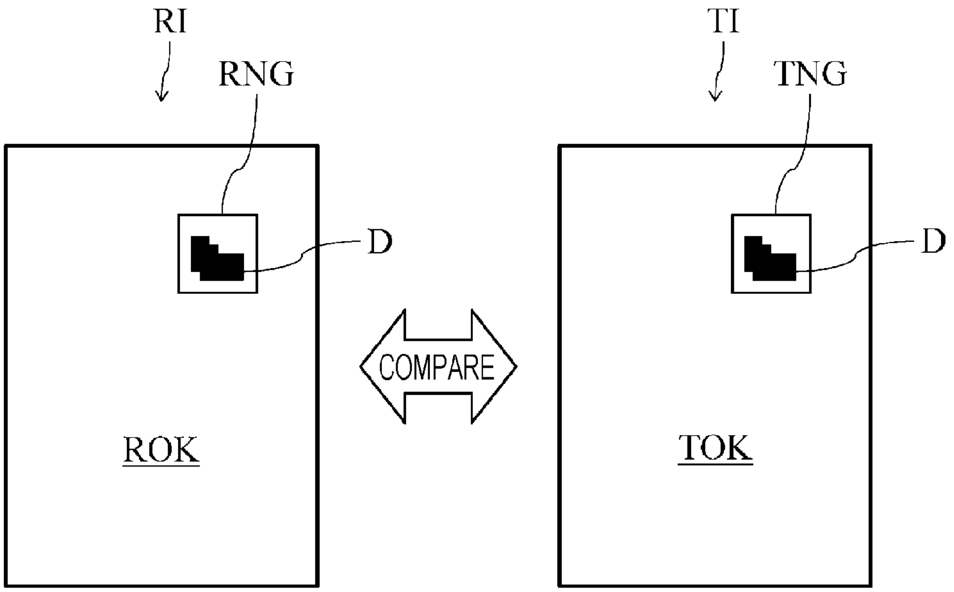
FIG. 3 schematically illustrates a comparison process performed by a comparison processor.

FIG. 3 schematically illustrates a comparison process performed by the comparison processor 42. The left part of FIG. 3 illustrates reference image data RI, and the right part of FIG. 3 illustrates inspection-target image data TI. The comparison processor 42 compares the reference image data RI received from the print server 12 with the inspection-target image data TI received from the multifunctional apparatus 14. In detail, the comparison processor 42 compares pixel values (e.g., RGB values) between the reference image data RI and the inspection-target image data TI for every corresponding pixel. As a result of this comparison, the comparison processor 42 determines that there is no difference in the pixels if the difference in the pixel values is smaller than a predetermined threshold value and determines that there is a difference in the pixels if the difference in the pixel values is larger than or equal to the predetermined threshold value. The threshold value may be appropriately set by a manager who manages the inspection apparatus 16.

In this exemplary embodiment, if there is less than a predetermined number of pixels in which the difference in the pixel values is larger than or equal to the threshold value between the reference image data RI and the inspection-target image data TI, the comparison processor 42 determines that the inspection-target image data TI is satisfactory image data that is not defective. On the other hand, if there is more than or equal to the predetermined number of pixels in which the difference in the pixel values is larger than or equal to the threshold value between the reference image data RI and the inspection-target image data TI, the comparison processor 42 determines that the inspection-target image data TI is defective. The predetermined number may also be appropriately set by the manager who manages the inspection apparatus 16.

In the example in FIG. 3, it is assumed that black-shaded pixels D are pixels in which the difference in the pixel values is larger than or equal to the threshold value, and that the comparison processor 42 determines that the inspection-target image data TI is defective. In the case where the comparison processor 42 determines that the inspection-target image data TI is defective, the comparison processor 42 identifies that a coordinate region with a predetermined size including the pixels D in which the difference in the pixel values is larger than or equal to the threshold value is a defective region. In detail, the comparison processor 42 identifies a defective region RNG in the reference image data RI, and identifies a defective region TNG in the inspection-target image data TI. In this description, a region other than the defective region RNG in the reference image data RI is referred to as a satisfactory region ROK, and a region other than the defective region TNG in the inspection-target image data TI is referred to as a satisfactory region TOK.

If the comparison processor 42 determines that the inspection-target image data TI is defective, the storage processor 44 stores image data based on the inspection-target image data TI and image data based on the reference image data RI corresponding thereto in association with each other into the image DB 38. In this exemplary embodiment, the storage processor 44 stores the satisfactory region ROK of the reference image data RI and the satisfactory region TOK of the inspection-target image data TI in a low volume format with a low data volume into the image DB 38, and stores the defective region RNG of the reference image data RI and the defective region TNG of the inspection-target image data TI in a high image quality format with a large data volume and high quality, as compared with the low volume format, into the image DB 38.

Figure 4:
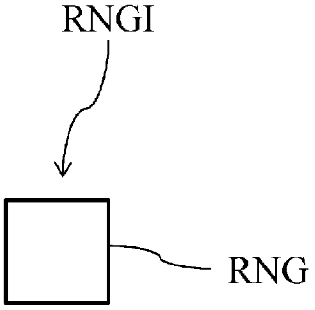
FIG. 4 illustrates defective-region image data of a reference image.
Figure 5:
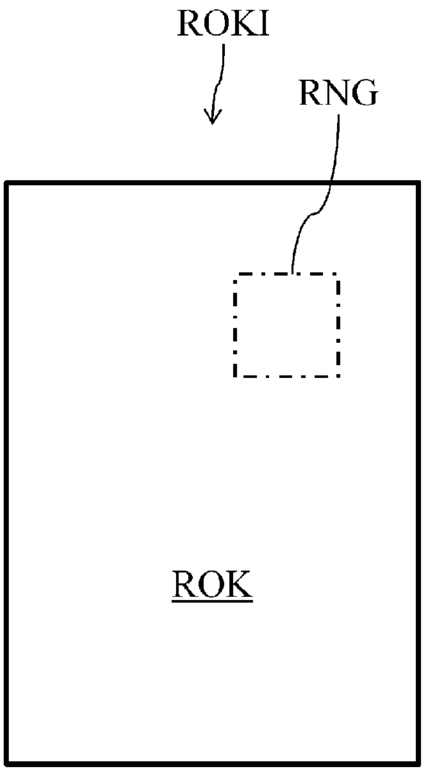
FIG. 5 illustrates satisfactory-region image data of the reference image.

In this exemplary embodiment, the storage processor 44 stores defective-region image data RNGI (see FIG. 4), serving as image data obtained as a result of extracting the defective region RNG from the reference image data RI, of the reference image and satisfactory-region image data ROKI (see FIG. 5), serving as image data including the satisfactory region ROK of the reference image data RI, of the reference image into the image DB 38. As an alternative to this exemplary embodiment in which the satisfactory-region image data ROKI includes the satisfactory region ROK and the defective region RNG, that is, the entire reference image data RI, the satisfactory-region image data ROKI may be image data (i.e., image data not including the defective region RNG) obtained as a result of extracting the satisfactory region ROK from the reference image data RI. As mentioned above, the defective-region image data RNGI is image data in the high image quality format, whereas the satisfactory-region image data ROKI is image data in the low volume format.

Figure 6:
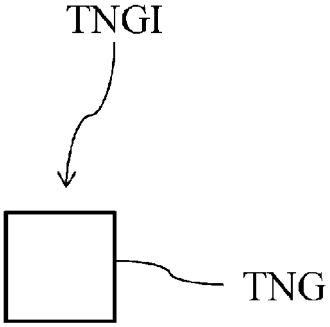
FIG. 6 illustrates defective-region image data of an inspection-target image.
Figure 7:
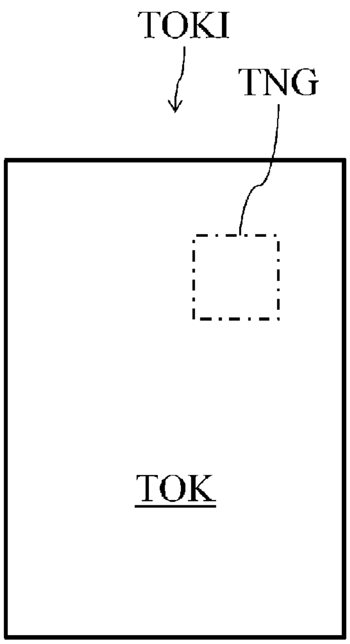
FIG. 7 illustrates satisfactory-region image data of the inspection-target image.

Likewise, in this exemplary embodiment, the storage processor 44 stores defective-region image data TNGI (see FIG. 6), serving as image data obtained as a result of extracting the defective region TNG from the inspection-target image data TI, of the inspection-target image and satisfactory-region image data TOKI (see FIG. 7), serving as image data including the satisfactory region TOK of the inspection-target image data TI, of the inspection-target image into the image DB 38. As an alternative to this exemplary embodiment in which the satisfactory-region image data TOKI includes the satisfactory region TOK and the defective region TNG, that is, the entire inspection-target image data TI, the satisfactory-region image data TOM may be image data (i.e., image data not including the defective region TNG) obtained as a result of extracting the satisfactory region TOK from the inspection-target image data TI. As mentioned above, the defective-region image data TNGI is image data in the high image quality format, whereas the satisfactory-region image data TOKI is image data in the low volume format.

For example, the low volume format is image data compressed at a high compression ratio. For example, the high image quality format is image data compressed at a lower compression ratio than the aforementioned high compression ratio or is non-compressed image data.

The compression ratio is changeable depending on, for example, the format of the image data. For example, the storage processor 44 stores the satisfactory-region image data ROKI and TOKI in a high-compressed low-data-volume JPEG format into the image DB 38, and stores the defective-region image data RNGI and TNGI in a low-compressed high-data-volume TIFF format into the image DB 38. Alternatively, the storage processor 44 stores the satisfactory-region image data ROKI and TOKI in the JPEG format into the image DB 38, and stores the defective-region image data RNGI and TNGI in the non-compressed bitmap (BMP) format into the image DB 38.

If the compression ratio is variable even in the same format, the storage processor 44 may set the satisfactory-region image data ROKI and TOKI and the defective-region image data RNGI and TNGI in the same format. For example, the storage processor 44 may store the satisfactory-region image data ROKI and TOKI in a JPEG format with a high compression ratio into the image DB 38, and may store the defective-region image data RNGI and TNGI in a JPEG format with a lower compression ratio than the aforementioned high compression ratio into the image DB 38.

The storage processor 44 may store the satisfactory-region image data ROKI and TOM as gray-scale images into the image DB 38, and may store the defective-region image data RNGI and TNGI as color images that have larger data volumes and higher image quality than the gray-scale images into the image DB 38. Furthermore, the storage processor 44 may store the satisfactory-region image data ROKI and TOKI as gray-scale images in a high-compressed low-data-volume format into the image DB 38, and may store the defective-region image data RNGI and TNGI as gray-scale images in a low-compressed high-data-volume format into the image DB 38.

According to this exemplary embodiment, the satisfactory regions ROK and TOK are stored in the low volume format in the image DB 38. Accordingly, the data volumes of the reference image data RI and the inspection-target image data TI may be reduced, so that a lack of storage capacity in the image DB 38 (i.e., the memory 36) may be suppressed, as compared with a case where the reference image data RI and the inspection-target image data TI are entirely stored in the high image quality format in the image DB 38. On the other hand, in this exemplary embodiment, the defective regions RNG and TNG are stored in the high image quality format in the image DB 38. Accordingly, deterioration in the image quality of the defective regions RNG and TNG caused by reduced data volumes of the reference image data RI and the inspection-target image data TI may be suppressed.

If the comparison processor 42 determines that the inspection-target image data TI is defective, the storage processor 44 may determine whether to store the defective regions RNG and TNG in the low volume format into the image DB 38 or in the high image quality format into the image DB 38 depending on the content of the reference image data RI or the inspection-target image data TI within the defective region RNG or TNG based on the aforementioned analysis information received from the print server 12.

For example, if the content of each of the defective region RNG and TNG is text, that is, if each of the defective regions RNG and TNG is within a text region indicated by the analysis information, the storage processor 44 stores the defective regions RNG and TNG in the low image quality format instead of the high image quality format into the image DB 38. This is because it is conceivable that the user may sufficiently recognize the text region even in low image quality. In contrast, if the content of each of the defective regions RNG and TNG is a picture or a photograph, that is, if each of the defective regions RNG and TNG is within an image region indicated by the analysis information, the storage processor 44 stores the defective regions RNG and TNG in the high image quality format into the image DB 38.

Furthermore, for example, if each of the defective regions RNG and TNG is in monochrome or gray scale, that is, if each of the defective regions RNG and TNG is within a monochrome region indicated by the analysis information, the storage processor 44 stores the defective regions RNG and TNG in the low image quality format instead of the high image quality format into the image DB 38. In contrast, if each of the defective regions RNG and TNG is in color, that is, if each of the defective regions RNG and TNG is within a color region indicated by the analysis information, the storage processor 44 stores the defective regions RNG and TNG in the high image quality format into the image DB 38.

If the defective regions RNG and TNG are to be set in the low image quality format, the reference image data RI and the inspection-target image data TI may entirely be set in the low image quality format (e.g., the images may entirely be converted into the JPEG format). If the defective regions RNG and TNG are to be compressed into the low image quality format, the compression ratio for the defective regions RNG and TNG does not have to be the same as the compression ratio for the satisfactory regions ROK and TOK.

Since it is determined that there is no difference between the satisfactory region ROK of the reference image data RI and the satisfactory region TOK of the inspection-target image data TI, the satisfactory region ROK and the satisfactory region TOK have a very small difference in the pixel values of the corresponding pixels. In other words, it may be regarded that the satisfactory region ROK and the satisfactory region TOK are substantially identical images. Therefore, the storage processor 44 may be configured not to store either the satisfactory region ROK of the reference image data RI or the satisfactory region TOK of the inspection-target image data TI into the image DB 38. Accordingly, a lack of storage capacity in the image DB 38 may be further suppressed.

The display controller 46 causes the display 34 to display the image data based on the reference image data RI and the image data based on the inspection-target image data TI that are stored in the image DB 38. In place of or in addition to the display 34, the display controller 46 may cause a second display to display the image data based on the reference image data RI and the image data based on the inspection-target image data TI. The second display may be a display of the print server 12 or a display of the user terminal that is used by the user and from which the print job related to the reference image data RI and the inspection-target image data TI is transmitted to the print server 12.

Figure 8:
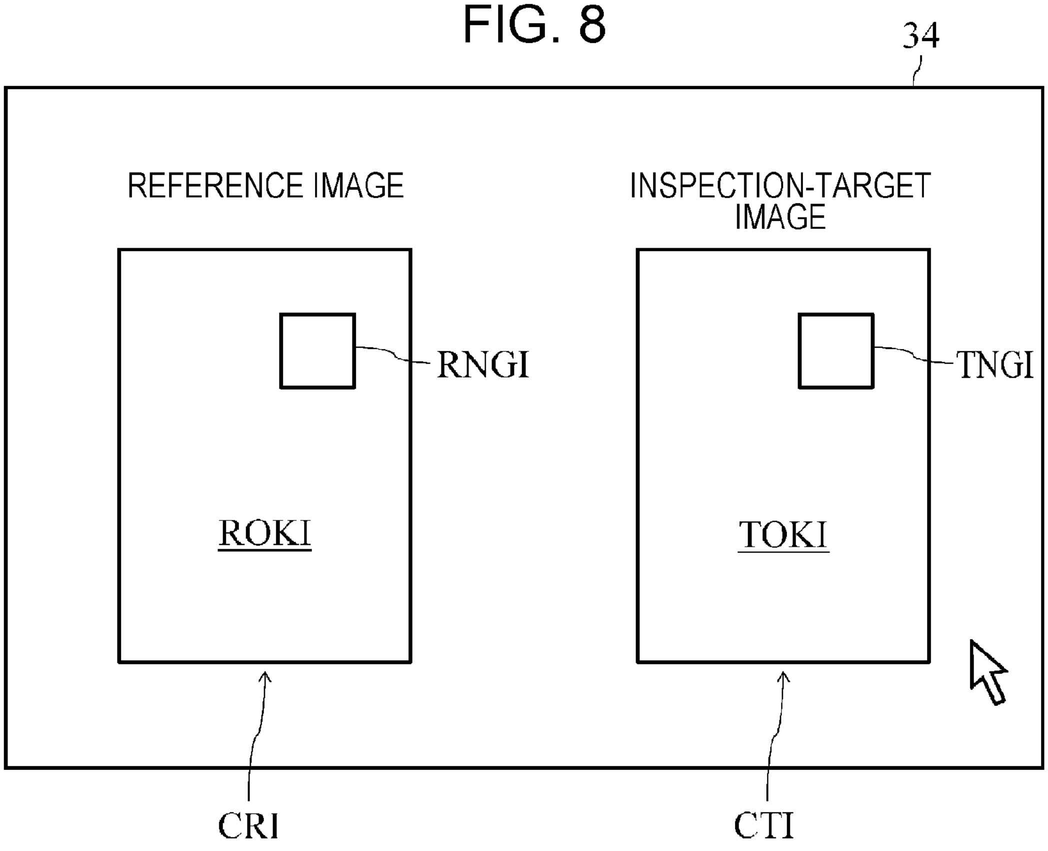
FIG. 8 illustrates a display example of combined reference image data and combined inspection-target image data.

FIG. 8 illustrates a display example of the image data based on the reference image data RI and the image data based on the inspection-target image data TI. As mentioned above, in the image DB 38, the satisfactory region ROK of the reference image data RI and the satisfactory region TOK of the inspection-target image data TI are stored in the low volume format, and the defective region RNG of the reference image data RI and the defective region TNG of the inspection-target image data TI are stored in the high image quality format. Therefore, the display controller 46 causes the display 34 to display combined reference image data CRI having a combination of the satisfactory region ROK of the reference image data RI in the low volume format and the defective region RNG of the reference image data RI in the high image quality format and combined inspection-target image data CTI having a combination of the satisfactory region TOK of the inspection-target image data TI in the low volume format and the defective region TNG of the inspection-target image data TI in the high image quality format. Accordingly, the user may check the defective regions RNG and TNG in high image quality.

As shown in FIG. 8, in this exemplary embodiment, the display controller 46 causes the display 34 to display the combined reference image data CRI having a combination of the satisfactory-region image data ROKI of the reference image and the defective-region image data RNGI of the reference image. Moreover, the display controller 46 causes the display 34 to display the combined inspection-target image data CTI having a combination of the satisfactory-region image data TOKI of the inspection-target image and the defective-region image data TNGI of the inspection-target image. In order to facilitate the comparison between these two pieces of image data for the user, the display controller 46 may display the combined reference image data CRI and the combined inspection-target image data CTI in a side-by-side fashion.

If the storage processor 44 does not store either the satisfactory region ROK of the reference image data RI or the satisfactory region TOK of the inspection-target image data TI into the image DB 38, the display controller 46 causes the display 34 to display the combined reference image data CRI stored in the image DB 38 and having a combination of the satisfactory region ROK or TOK of either the reference image data RI or the inspection-target image data TI and the defective region RNG of the reference image data RI in the high image quality format and the combined inspection-target image data CTI stored in the image DB 38 and having a combination of the satisfactory region ROK or TOK of either the reference image data RI or the inspection-target image data TI and the defective region TNG of the inspection-target image data TI in the high image quality format.

Figure 9:
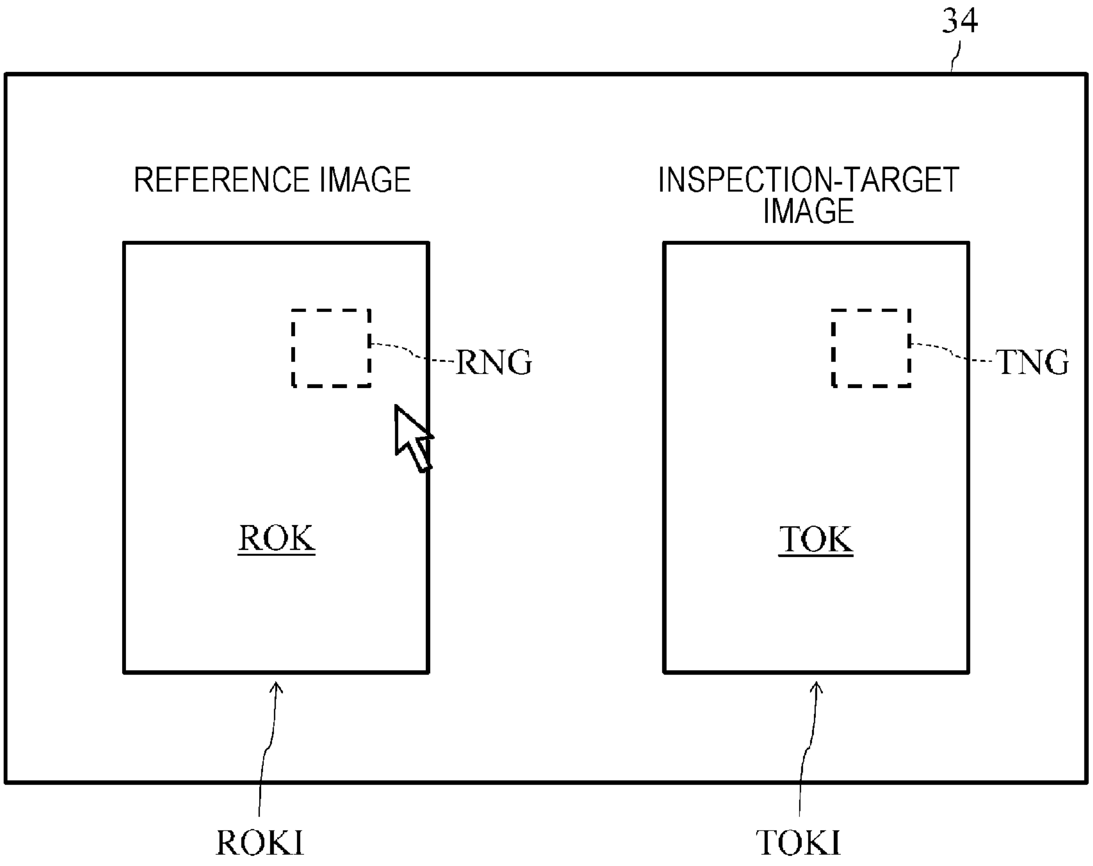
FIG. 9 illustrates a display example of the satisfactory-region image data of the reference image and the inspection-target image.
Figure 10:
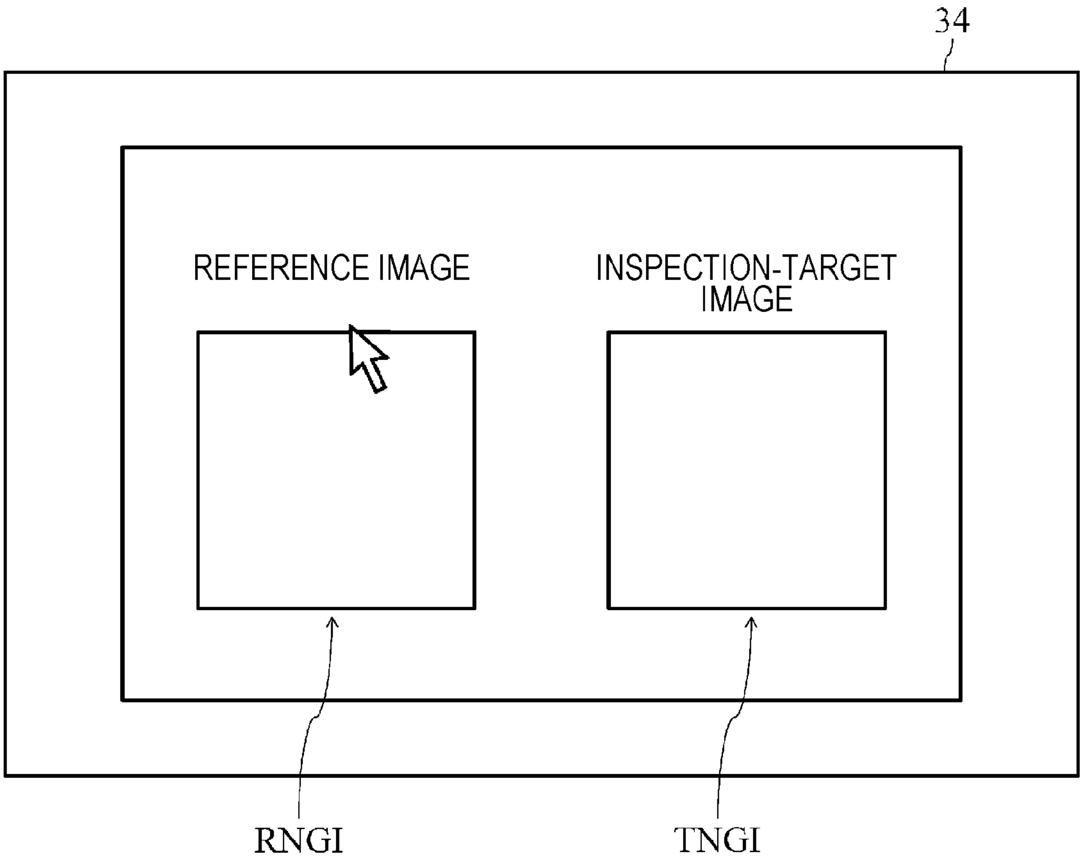
FIG. 10 illustrates a display example of the defective-region image data of the reference image and the inspection-target image.

Furthermore, as shown in FIG. 9, the display controller 46 may cause the display 34 to first display the satisfactory-region image data ROKI of the reference image in the low volume format including the satisfactory region ROK and the defective region RNG, as well as the satisfactory-region image data TOKI of the inspection-target image in the low volume format including the satisfactory region TOK and the defective region TNG. In this case, in order for the user to recognize the locations of the defective regions RNG and TNG, an icon indicating the defective region RNG may be displayed. When the user selects the defective region RNG or TNG by using, for example, a cursor, the display controller 46 may cause the display 34 to display the defective-region image data RNGI of the reference image and the defective-region image data TNGI of the inspection-target image in an enlarged fashion, as shown in FIG. 10.

In this exemplary embodiment, the reference image data RI is the raster image data received from the print server 12, and the inspection-target image data TI is the read image data received from the multifunctional apparatus 14. The comparison processor 42 may perform the comparison between the reference image data RI and the inspection-target image data TI, the storage processor 44 may store the satisfactory regions ROK and TOK of the reference image data RI and the inspection-target image data TI and the defective regions RNG and TNG of the reference image data RI and the inspection-target image data TI into the image DB 38, and the display controller 46 may cause the display 34 to display the combined reference image data CRI and the combined inspection-target image data CTI immediately after the inspection apparatus 16 receives the reference image data RI and the inspection-target image data TI. In other words, the inspection process by the processor 40 may be executed in real time with the printing process based on the print job. Accordingly, when it is determined that the print medium is defective in accordance with the inspection process, the user may immediately execute the printing process related to the raster image data again.

Figure 11:
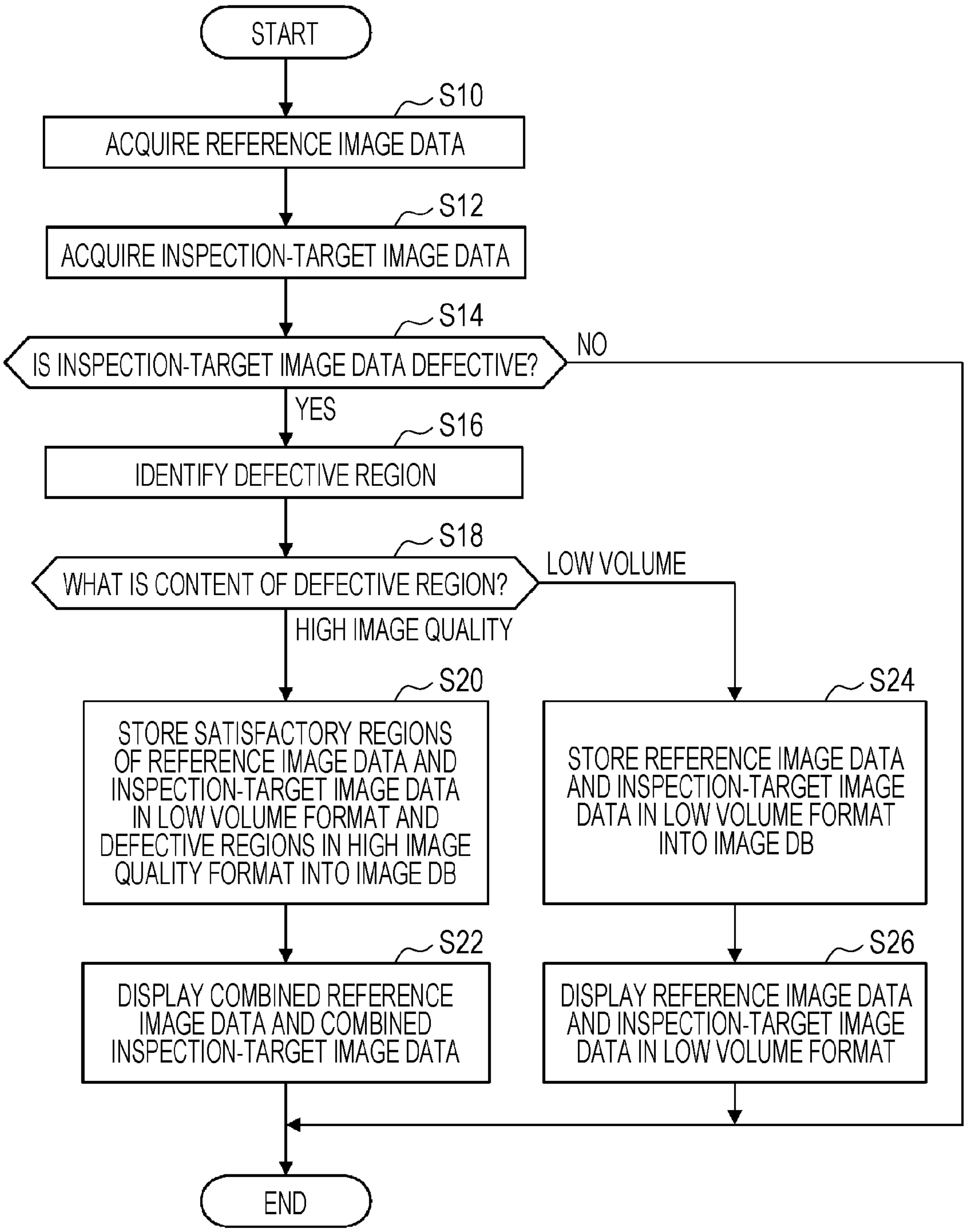
FIG. 11 is a flowchart illustrating the flow of a process performed by the inspection apparatus according to this exemplary embodiment.

An overview of the inspection apparatus 16 according to this exemplary embodiment has been described above. The flow of a process performed by the inspection apparatus 16 will be described below with reference to a flowchart shown in FIG. 11.

In step S10, the processor 40 receives the raster image data as the reference image data RI from the print server 12. The processor 40 also receives, from the print server 12, the analysis information obtained as a result of analyzing the print job and indicating the content of the raster image data (or the print image data).

In step S12, the processor 40 receives the read image data as the inspection-target image data TI from the multifunctional apparatus 14.

In step S14, the comparison processor 42 compares the reference image data RI acquired in step S10 with the inspection-target image data TI acquired in step S12 and determines whether or not the inspection-target image data TI is defective. If the inspection-target image data TI is not defective, the process ends. If the inspection-target image data TI is defective, the process proceeds to step S16.

In step S16, the comparison processor 42 identifies the coordinate region with the predetermined size including pixels in which the difference in the pixel values is larger than or equal to the threshold value in the comparison in step S14 as each of the defective regions RNG and TNG.

In step S18, the storage processor 44 identifies the content of each of the defective regions RNG and TNG identified in step S16 based on the analysis information acquired in step S10. For example, in a case where the content of each of the defective region RNG and TNG is a picture or a photograph or is in color, the process proceeds to step S20 if the defective regions RNG and TNG are to be processed in the high image quality format. In a case where the content of each of the defective region RNG and TNG is text or is in monochrome or gray scale, the process proceeds to step S24 if the defective regions RNG and TNG are to be processed in the low volume format.

In step S20, the storage processor 44 stores the satisfactory region ROK of the reference image data RI and the satisfactory region TOK of the inspection-target image data TI in the low volume format into the image DB 38, and stores the defective region RNG of the reference image data RI and the defective region TNG of the inspection-target image data TI in the high image quality format into the image DB 38.

In step S22, the display controller 46 causes the display 34 to display the combined reference image data CRI having the combination of the satisfactory region ROK of the reference image data RI in the low volume format and the defective region RNG of the reference image data RI in the high image quality format and the combined inspection-target image data CTI having the combination of the satisfactory region TOK of the inspection-target image data TI in the low volume format and the defective region TNG of the inspection-target image data TI in the high image quality format.

In step S24, the storage processor 44 stores the reference image data RI and the inspection-target image data TI in the low volume format into the image DB 38.

In step S26, the display controller 46 causes the display 34 to display the reference image data RI and the inspection-target image data TI in the low volume format.

Although the exemplary embodiment of the present disclosure has been described above, the exemplary embodiment of the present disclosure is not limited to that described above, and permits various modifications so long as they do not depart from the exemplary embodiment of the present disclosure.

For example, although the inspection target is the print medium having undergone printing in the multifunctional apparatus 14 in this exemplary embodiment, the inspection target is not limited to the print medium. The exemplary embodiment of the present disclosure is applicable so long as the reference image data and the inspection-target image data are stored in the memory when there is a difference between the reference image data and the inspection-target image data as a result of being compared with each other.

Furthermore, as an alternative to this exemplary embodiment in which the inspection apparatus 16 includes the image DB 38 and has the functions of the comparison processor 42, the storage processor 44, and the display controller 46, the image DB 38 and these functions may be included in the print server 12 or the multifunctional apparatus 14.

In the embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the embodiments above, the term "processor" is broad enough to encompass one processor or plural processors in collaboration which are located physically apart from each other but may work cooperatively. The order of operations of the processor is not limited to one described in the embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

APPENDIX (((1)))

An image processing apparatus comprising:

a processor configured to:

compare reference image data serving as a reference for inspection with inspection-target image data expressing an inspection target and identify a coordinate region including a difference between the reference image data and the inspection-target image data as a defective region; and store a satisfactory region in the reference image data and the satisfactory region in the inspection-target image data in a low volume format with a low data volume into a memory, and store the defective region in the reference image data and the defective region in the inspection-target image data in a high image quality format with a large data volume and high image quality, as compared with the low volume format, into the memory, the satisfactory region being a region other than the defective region.

(((2)))

The image processing apparatus according to (((1))), wherein the low volume format is image data compressed at a high compression ratio, and wherein the high image quality format is image data compressed at a lower compression ratio than the high compression ratio or is non-compressed image data.

(((3)))

The image processing apparatus according to (((1))) or (((2))), wherein the inspection-target image data is obtained by reading a print medium having printed thereon print image data related to a print request, and wherein the processor is configured to determine whether to store the defective region of the reference image data and the defective region of the inspection-target image data in the low volume format into the memory or in the high image quality format into the memory depending on content of the reference image data or the inspection-target image data within the defective region identified based on the print image data.

(((4)))

The image processing apparatus according to any one of (((1))) to (((3))), wherein the processor is configured not to store the satisfactory region of either the reference image data or the inspection-target image data into the memory.

(((5)))

The image processing apparatus according to any one of (((1))) to (((3))), wherein the processor is configured to cause a display to display combined reference image data and combined inspection-target image data, the combined reference image data having a combination of the satisfactory region of the reference image data in the low volume format and the defective region of the reference image data in the high image quality format, the combined inspection-target image data having a combination of the satisfactory region of the inspection-target image data in the low volume format and the defective region of the inspection-target image data in the high image quality format.

(((6)))

The image processing apparatus according to (((4))), wherein the processor is configured to cause a display to display combined reference image data and combined inspection-target image data, the combined reference image data being stored in the memory and having a combination of the satisfactory region of either the reference image data or the inspection-target image data and the defective region of the reference image data in the high image quality format, the combined inspection-target image data being stored in the memory and having a combination of the satisfactory region of either the reference image data or the inspection-target image data and the defective region of the inspection-target image data in the high image quality format.

(((7)))

An image processing program causing a computer to execute a process, the process comprising:

comparing reference image data serving as a reference for inspection with inspection-target image data expressing an inspection target and identifying a coordinate region including a difference between the reference image data and the inspection-target image data as a defective region; and causing a memory to store a region other than the defective region in the reference image data and a region other than the defective region in the inspection-target image data in a low volume format with a low data volume, and causing the memory to store the defective region in the reference image data and the defective region in the inspection-target image data in a high image quality format with a large data volume and high image quality, as compared with the low volume format.

What is claimed is:

1. An image processing apparatus comprising:

a processor configured to:

compare reference image data serving as a reference for inspection with inspection-target image data expressing an inspection target by comparing values of corresponding pixels in the reference image data and the inspection-target image data and identify, in both the reference image data and the inspection-target image data, a coordinate region with a predetermined size including pixels in which the difference in pixel values between the corresponding pixels of the reference image data and the inspection-target image data is larger than or equal to a threshold value as a defective region; and store a satisfactory region in the reference image data and a satisfactory region in the inspection-target image data in a low volume format with a low data volume into a memory, and store the defective region in the reference image data and the defective region in the inspection-target image data in a high image quality format with a large data volume and high image quality, as compared with the low volume format, into the memory, the satisfactory region being a region other than the defective region.

2. The image processing apparatus according to claim 1, wherein the low volume format is image data compressed at a high compression ratio, and wherein the high image quality format is image data compressed at a lower compression ratio than the high compression ratio or is non-compressed image data.

3. The image processing apparatus according to claim 2, wherein the inspection-target image data is obtained by reading a print medium having printed thereon print image data related to a print request, and wherein the processor is configured to determine whether to store the defective region of the reference image data and the defective region of the inspection-target image data in the low volume format into the memory or in the high image quality format into the memory depending on content of the reference image data or the inspection-target image data within the defective region identified based on the print image data.

4. The image processing apparatus according to claim 2, wherein the processor is configured not to store the satisfactory region of either the reference image data or the inspection-target image data into the memory.

5. The image processing apparatus according to claim 4, wherein the processor is configured to cause a display to display combined reference image data and combined inspection-target image data, the combined reference image data being stored in the memory and having a combination of the satisfactory region of either the reference image data or the inspection-target image data and the defective region of the reference image data in the high image quality format, the combined inspection-target image data being stored in the memory and having a combination of the satisfactory region of either the reference image data or the inspection-target image data and the defective region of the inspection-target image data in the high image quality format.

6. The image processing apparatus according to claim 2, wherein the processor is configured to cause a display to display combined reference image data and combined inspection-target image data, the combined reference image data having a combination of the satisfactory region of the reference image data in the low volume format and the defective region of the reference image data in the high image quality format, the combined inspection-target image data having a combination of the satisfactory region of the inspection-target image data in the low volume format and the defective region of the inspection-target image data in the high image quality format.

7. The image processing apparatus according to claim 1, wherein the inspection-target image data is obtained by reading a print medium having printed thereon print image data related to a print request, and wherein the processor is configured to determine whether to store the defective region of the reference image data and the defective region of the inspection-target image data in the low volume format into the memory or in the high image quality format into the memory depending on content of the reference image data or the inspection-target image data within the defective region identified based on the print image data.

8. The image processing apparatus according to claim 1, wherein the processor is configured not to store the satisfactory region of either the reference image data or the inspection-target image data into the memory.

9. The image processing apparatus according to claim 8, wherein the processor is configured to cause a display to display combined reference image data and combined inspection-target image data, the combined reference image data being stored in the memory and having a combination of the satisfactory region of either the reference image data or the inspection-target image data and the defective region of the reference image data in the high image quality format, the combined inspection-target image data being stored in the memory and having a combination of the satisfactory region of either the reference image data or the inspection-target image data and the defective region of the inspection-target image data in the high image quality format.

10. The image processing apparatus according to claim 1, wherein the processor is configured to cause a display to display combined reference image data and combined inspection-target image data, the combined reference image data having a combination of the satisfactory region of the reference image data in the low volume format and the defective region of the reference image data in the high image quality format, the combined inspection-target image data having a combination of the satisfactory region of the inspection-target image data in the low volume format and the defective region of the inspection-target image data in the high image quality format.

11. A non-transitory computer readable medium storing a program causing a computer to execute a process for processing an image, the process comprising:

comparing reference image data serving as a reference for inspection with inspection-target image data expressing an inspection target by comparing values of corresponding pixels in the reference image data and the inspection-target image data and identifying, in both the reference image data and the inspection-target image data, a coordinate region with a predetermined size including pixels in which the a difference in pixel values between the corresponding pixels of the reference image data and the inspection-target image data is larger than or equal to a threshold value as a defective region; and causing a memory to store a region other than the defective region in the reference image data and a region other than the defective region in the inspection-target image data in a low volume format with a low data volume, and causing the memory to store the defective region in the reference image data and the defective region in the inspection-target image data in a high image quality format with a large data volume and high image quality, as compared with the low volume format.

12. An image processing method comprising:

comparing reference image data serving as a reference for inspection with inspection-target image data expressing an inspection target by comparing values of corresponding pixels in the reference image data and the inspection-target image data and identifying, in both the reference image data and the inspection-target image data, a coordinate region with a predetermined size including pixels in which the a difference in pixel values between the corresponding pixels of the reference image data and the inspection-target image data is larger than or equal to a threshold value as a defective region; and causing a memory to store a region other than the defective region in the reference image data and a region other than the defective region in the inspection-target image data in a low volume format with a low data volume, and causing the memory to store the defective region in the reference image data and the defective region in the inspection-target image data in a high image quality format with a large data volume and high image quality, as compared with the low volume format.

* * * * *